United States Patent
Chen et al.

[11] Patent Number: 5,841,758
[45] Date of Patent: Nov. 24, 1998

[54] METHOD OF OPTIMALLY PLACING CONCENTRATOR SWITCHES IN A NETWORK

[75] Inventors: Cheng C. Chen, Carrollton; David G. Way, Garland, both of Tex.

[73] Assignee: MCI Communications Corporation, Washington, D.C.

[21] Appl. No.: 777,303

[22] Filed: Dec. 27, 1996

[51] Int. Cl.$^6$ .................................................. H04J 11/00
[52] U.S. Cl. .......................................... 370/238; 370/400
[58] Field of Search ................................. 370/238, 252, 370/254, 255, 256, 351, 400, 408; 395/200.68, 200.71, 200.73, 200.74

[56] References Cited

U.S. PATENT DOCUMENTS 5,317,566   5/1994   Joshi ........................................ 370/60

OTHER PUBLICATIONS

Chung et al, "An Enhanced Zero–One Optimal Path Set Selection Method", Department of Computer Science and Information Engineering, National Chiao Tung University, Hsin–Chu, Taiwan, Republic of China, Oct. 1996.

*Primary Examiner*—Chi H. Pham
*Assistant Examiner*—Afsar Qureshi

[57] ABSTRACT

A method of locating concentrator switches in an existing network that includes a plurality of sites interconnected by existing links so as to minimize total network cost in terms of transmission cost, equipment cost, and facility cost, while meeting all traffic demands. The method uses a Lagrange relaxation technique to perform the optimization. First, the method assigns to each site j an initial Lagrange multiplier $\lambda_j$. Then the method selects from the sites a set of core nodes j such that the facility cost $v_j$ for each selected core node j is less than the Lagrange multiplier $\lambda_j$ for the site multiplied by the number of ports $k_1$ in a concentrator switch, inherently forming a set of remaining source nodes i. Then the method homes the source nodes i to the core node j such that the cost to connect a source node i to a selected core node j plus the Lagrange multiplier $\lambda_j$ for the selected core node j multiplied by the traffic $a_i$ from said source node i is a minimum. The method calculates an upper bound and a lower bound for the cost of the network. Then, the method subtracts the lower bound from the upper bound and determines whether the difference is less than a predetermined value. If the difference between the upper bound and the lower bound is not less than the predetermined value, the method uses a subgradient technique to adjust the Lagrange multiplier $\lambda_j$ for each site j. The method performs iterations of adjusting the Lagrange multipliers $\lambda_j$, selecting core nodes j, and homing source nodes i until the difference between the upper bound and the lower bound is less than the predetermined value.

17 Claims, 3 Drawing Sheets

METHOD OF OPTIMALLY PLACING CONCENTRATOR SWITCHES IN A NETWORK

FIELD OF THE INVENTION

The present invention relates generally to communication network design, and more particularly to a method of optimizing a telecommunications network in terms of transmission cost, equipment cost, and facility cost, by selecting optimal locations for concentrator switches.

DESCRIPTION OF THE PRIOR ART

Modern digital telecommunications systems are built upon hierarchical networks. A network consists of a plurality of nodes or sites that are interconnected by transmission facilities. Generally, lower bandwidth channels to and from source nodes are multiplexed or concentrated into higher bandwidth channels at core nodes. For example, up to twelve 44.736 Mbps DS3 channels may be multiplexed into a single 622.08 Mbps OC-12 channel. Similarly, up to sixteen OC-12 channels may be multiplexed into a single OC-192 channel.

It is a goal of telecommunications network design to serve the demand at the least cost. The elements of cost in a network are transmission costs, equipment costs, and facility costs. The transmission cost is based on the distance between nodes multiplied by the cost per unit of distance of the transmission media per line multiplied by the number of lines necessary to meet the demand. Equipment cost is determined by the demand multiplied by the cost per port necessary to multiplex multiple channels into a single channel. The facility cost is the cost required to install a concentrator switch at a particular location.

Given a particular network configuration, it is not difficult to compute the total cost for the configuration. The cost for the configuration is obtained simply by summing the transmission costs, equipment costs, and facility costs. Therefore, it is theoretically possible to find the lowest cost network configuration by computing the total cost for each possible configuration and then selecting the one with the lowest cost. However, in a large network with about 200 nodes, it would take the most powerful computer hours if not days to test all combinations of nodes.

It is therefore an object of the present invention to provide a fast, computationally efficient, method for locating concentrator switches in an existing network that produces near optimal total network costs while meeting network demand.

SUMMARY OF THE INVENTION

Briefly stated, the present invention provides a method of locating concentrator switches in an existing network that includes a plurality of sites interconnected by existing links so as to minimize total network cost in terms of transmission cost, equipment cost, and facility cost, while meeting all traffic demands. The transmission cost includes the cost of the links. The equipment cost includes the cost per port of the concentrator switches. The facility cost includes the cost to install a concentrator switch at a particular location.

The method uses a Lagrange relaxation technique to perform the optimization of the present invention. First, the method assigns to each site j an initial Lagrange multiplier $\lambda_j$. Then the method selects from the sites a set of core nodes j such that the facility cost $v_j$ for each selected core node j is less than the Lagrange multiplier $\lambda_j$ for the site multiplied by the number of ports $k_1$ in a concentrator switch. The selection of the core nodes j inherently forms a set of remaining source nodes i. Then the method homes each one of the source nodes i to a single selected core node j such that the cost to connect a source node i to a selected core node j plus the Lagrange multiplier $\lambda_j$ for the selected core node j multiplied by the traffic $a_i$ from said source node i is a minimum. The method calculates an upper bound and a lower bound for the cost of the network. Then, the method subtracts the lower bound from the upper bound and determines whether the difference is less than a predetermined value.

If the difference between the upper bound and the lower bound is not less than the predetermined value, the method uses a subgradient technique to adjust the Lagrange multiplier $\lambda_j$ for each site j. The method selects a set of core nodes j based on the adjusted Lagrange multipliers $\lambda_j$ and rehomes the remaining source nodes i. The method then recalculates the upper and lower bounds for the cost of the network as configured. The method performs iterations of adjusting the Lagrange multipliers $\lambda_j$, selecting core nodes j, and homing source nodes i until the sooner to occur of the difference between the upper bound and the lower bound being less than the predetermined value, or the number iterations exceeding a preselected number, at which time a near optimum solution has been found.

More particularly, the core nodes j are selected such that $Y_j=1$, where $$Y_j = \begin{cases} 1 & \text{if } (v_j - \lambda_j \cdot k_1) < 0 \\ 0 & \text{else} \end{cases}.$$

Each source node i is homed to a selected core node j such that $X_{ij}=1$, where $$X_{ij} = \begin{cases} 1 & \text{if } j \\ 0 & \text{else} \end{cases} = \min_{j \, S} (e_{ij} + \lambda_j \cdot a_i), \; e_{ij} = f_{ij}(a_i + b_i) + c_j \cdot a_i,$$

cost from source i to node j, $a_i$ is the total traffic originated at node i, $b_i$ is the total traffic terminated at node i, and $c_j$ is the cost per port in a concentrator switch at a core node j. The initial Lagrange multiplier $\lambda_j$ is selected such that $\lambda_j=100+(0.025)*j$.

The method calculates an upper bound U for the cost of the network such that $$U = \sum_{j=1}^{n} \sum_{i=1}^{n} f_{ij}(a_i + b_i) \cdot X_{ij} + \sum_{j=1}^{n} \sum_{i=1}^{n} c_j \cdot a_i \cdot X_{ij} + \sum_{j=1}^{n} v_j \cdot Y_j.$$

Then, the method calculates a lower bound $\xi_m$ such that $$\xi_m = U + \sum_{j=1}^{n} \lambda_j^m \cdot \left( \left( \sum_{i=1}^{n} a_i \cdot X_{ij} \right) - (k_1 \cdot Y_j) \right).$$

Whenever the difference between the upper and lower bounds is substantially equal to 0.0001, a near optimum solution has been found.

In the subgradient technique, $\lambda_j$ is adjusted such that $$\lambda_j^{(m+1)} = \max \left\{ 0, \lambda_j^m + \Delta_m \left( \sum_{i=1}^{n} X_{ij} \cdot a_i - k_1 Y_j \right) \right\}$$

where

-continued $$\Delta_m = \frac{\alpha_m(U - \xi_m)}{\left( \sum_{j=1}^{n} \left( \sum_{i=1}^{n} X_{ij} \cdot a_i - k_1 Y_j \right) \right)^2}$$

and $\alpha_m = \frac{\alpha_{m-1}}{2}$ ; $\alpha_1 = 2.0$.

The subgradient technique then determines whether $$\sum_{j=1}^{n} (\lambda_j^{(m+1)} - \lambda_j^m)^2 < \theta,$$

where $\theta$ is a preselected constant. If not, then the method iteratively lets m=m+1, and recomputes $\alpha_m$, $\Delta_m$, and $\lambda_j$ until $\theta$ is less than the preselected constant, or until m=50.

DESCRIPTION OF THE PREFERRED EMBODIMENT

Figure 1:
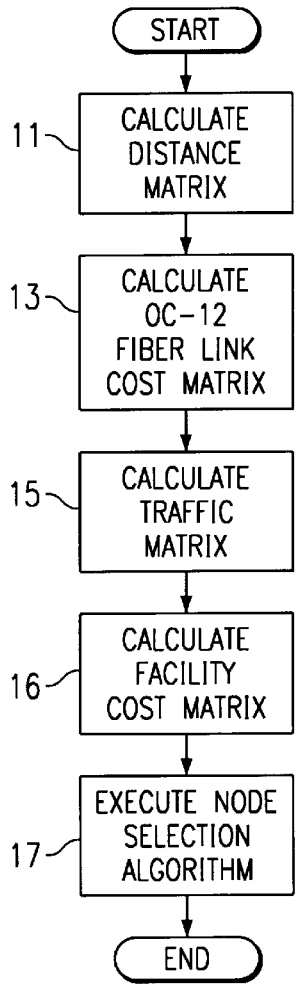
FIG. 1 is a high level flowchart of the overall implementation of the method of the present invention.

In a hierarchical communications network, traffic from source nodes is homed on relatively lower bandwidth communications channels to core nodes. The core nodes concentrate the traffic from the source nodes into relatively high bandwidth channels for transmission to other core nodes in the network. The total cost of the network consists of transmission costs, equipment costs, and facility costs. The transmission cost is the cost of the media that connects the nodes. The equipment cost is determined by the number of ports in the core nodes. The facility cost is determined by the cost necessary to install a core node at a particular location.

In a network of n nodes, the total cost of the network can be written mathematically as follows:

$$\text{Cost} = A + \sum_{i=1}^{n} \sum_{j=1}^{n} c_j \cdot a_i \cdot X_{ij} + \sum_{j=1}^{n} v_j \cdot Y_j$$

where A is the transmission cost. In the middle term, which represents equipment cost, $c_j$ is the cost per port on a node j, $a_i$ is the traffic originated at source i, and $X_{ij}$ is equal to 1 when source i is connected to core node j, and zero if not. In the third term, which represents facility cost, $v_j$ is the facility cost for node j, and $Y_j$ is equal to 1 when j is a core node, and zero if not.

Transmission cost A can be expressed mathematically as follows:

$$A = \sum_{i=1}^{n} \sum_{k=1}^{n} \sum_{j=1}^{n} c_3 \cdot a_{ij} \cdot d_{ik} \cdot X_{ik} +$$

$$\sum_{i=1}^{n} \sum_{k=1}^{n} \left( \sum_{l=1}^{n} r \cdot c_3 d_{kl} \cdot \left( \sum_{j=1}^{n} a_{ij} \cdot X_{jl} \right) \right) \cdot X_{ik} + B$$

$$B = \sum_{l=1}^{n} \sum_{j=1}^{n} c_3 \cdot d_{jl} \cdot \left( \sum_{i=1}^{n} a_{ij} \cdot X_{jl} \right)$$

where $C_3$ is the cost of the lower bandwidth transmission media, $a_{ij}$ is the traffic from node i to node j, $d_{ik}$ is the distance from node i to node k, r is the ratio of the cost of the lower bandwidth channel to the cost of the higher bandwidth channel, and $d_{kl}$ is the distance from node k to node l.

The total network cost can be minimized by minimizing the foregoing algebraic statement of cost subject to the following conditions:

$$\sum_{j \in J} X_{ij} = 1 \text{ for all } i \in I,$$

$$\sum_{i=1}^{n} a_i \cdot X_{ij} \leq k_1$$

for all j ∈ J, where $$a_i = \sum_{k \neq i} a_{ik},$$

and $k_1$ is the number of ports in a core node switch.

It will be observed that the foregoing algebraic statement of total network cost is quadratic in form. Therefore, finding a minimum network configuration is very difficult.

The node selection problem can be simplified somewhat by writing a linear approximation of the cost function as follows:

$$\text{Cost} = \sum_{i=1}^{n} \sum_{j=1}^{n} (a_i + b_i) \cdot d_{ij} \cdot c_3 \cdot X_{ij} + \sum_{i=1}^{n} \sum_{j=1}^{n} c_j \cdot a_i \cdot X_{ij} + \sum_{j=1}^{n} v_j \cdot Y_j$$

Again, $a_i$ is the traffic originated from node i, $b_i$ is the traffic terminated at node i, $c_3$ is the cost of the lower bandwidth transmission media, $c_j$ is the cost per port in a core node j switch, $d_{ij}$ is the distance from node i to node j, and $v_j$ is the cost to install a core switch at a core node. $X_{ij}$ is equal to 1 whenever a source node i is connected to a core node j, else 0, and $Y_j$ is equal to 1 whenever node j is a core node, else 0. Again, the total network cost, according to the linear approximation, can be minimized subject to the following constraints:

$$\sum_{j \in J} X_{ij} = 1 \text{ for all } i \in I$$

$$X_{ij} - Y_j \leq 0 \text{ for all } i \in I, j \in J$$

$$\sum_{i=1}^{n} a_i \cdot X_{ij} \leq k_1$$

for all $j \in J$, where $$a_i = \sum_{k \neq i} a_{ik},$$

and $k_1$ is the number of ports in a core node switch.

While the linear approximation is much simpler than the quadratic form of the cost equation, finding a minimum cost network configuration is still very difficult. The present invention finds a minimum solution according to a Lagrange relaxation technique. First, the second and third constraints above are combined into one as follows:

$$\sum_{i \in I} a_i \cdot X_{ij} \leq k_1 \cdot Y_j, \text{ for } j \in J.$$

Then, the method relaxes on the combined constraint with the following objective function:

$$\sum_{i \in I} \sum_{j \in J} e_{ij} \cdot X_{ij} + \sum_{j \in J} V_j \cdot Y_j + \sum_{j \in J} \lambda_j \cdot \left( \sum_{i \in I} a_i \cdot X_{ij} - k_1 \cdot Y_j \right); \lambda_j \geq 0, j \in J.$$

where $e_{ij}=f_{ij}(a_i+b_i)+a_ic_j$, $f_j=d_{ij} \cdot c_3$, and $\lambda_j$ is a Lagrange multiplier. Lagrange multipliers are well-known in the field of non-linear optimization theory for continuous functions to solve maximum and minimum problems.

From the foregoing, it may be seen that the optimization problem becomes:

$$\underset{\lambda_j}{\text{Max}} \underset{X_{ij}, Y_j}{\text{Min}} \sum_{i \in I} \sum_{j \in J} (e_{ij} + \lambda_j \cdot a_i) \cdot X_{ij} + \sum_{j \in J} (v_j - \lambda_j \cdot k_1) \cdot Y_j.$$

The optimization of the present invention is implemented in software. Referring to FIG. 1, the method first calculates the distance matrix D at block 11. Distance matrix D is a table of the distances between each node i and j, of the form as follows:

$$D = \begin{bmatrix} \cdots & \cdots & \cdots \\ \cdots & d_{ij} & \cdots \\ \cdots & \cdots & \cdots \end{bmatrix}$$

Then, at block 13, the method calculates the fiber link cost matrix F. Fiber link cost matrix F is the product of the fiber cost per mile $c_3$ times distance matrix D. Accordingly, $$F = c_3 D = \begin{bmatrix} \cdots & \cdots & \cdots \\ \cdots & f_{ij} & \cdots \\ \cdots & \cdots & \cdots \end{bmatrix}$$

At block 15, the method calculates the traffic matrix A, which is a listing of the traffic associated with each source i, as follows:

$$A = \begin{bmatrix} \cdots & \cdots & \cdots \\ \cdots & a_{ij} & \cdots \\ \cdots & \cdots & \cdots \end{bmatrix}$$

Finally, at block 16, the method calculates the facility cost matrix V, which is a listing of the cost necessary to install a core switch at each node j as follows:

$$V = \begin{bmatrix} \cdots \\ v_j \\ \cdots \end{bmatrix}$$

Figure 2:
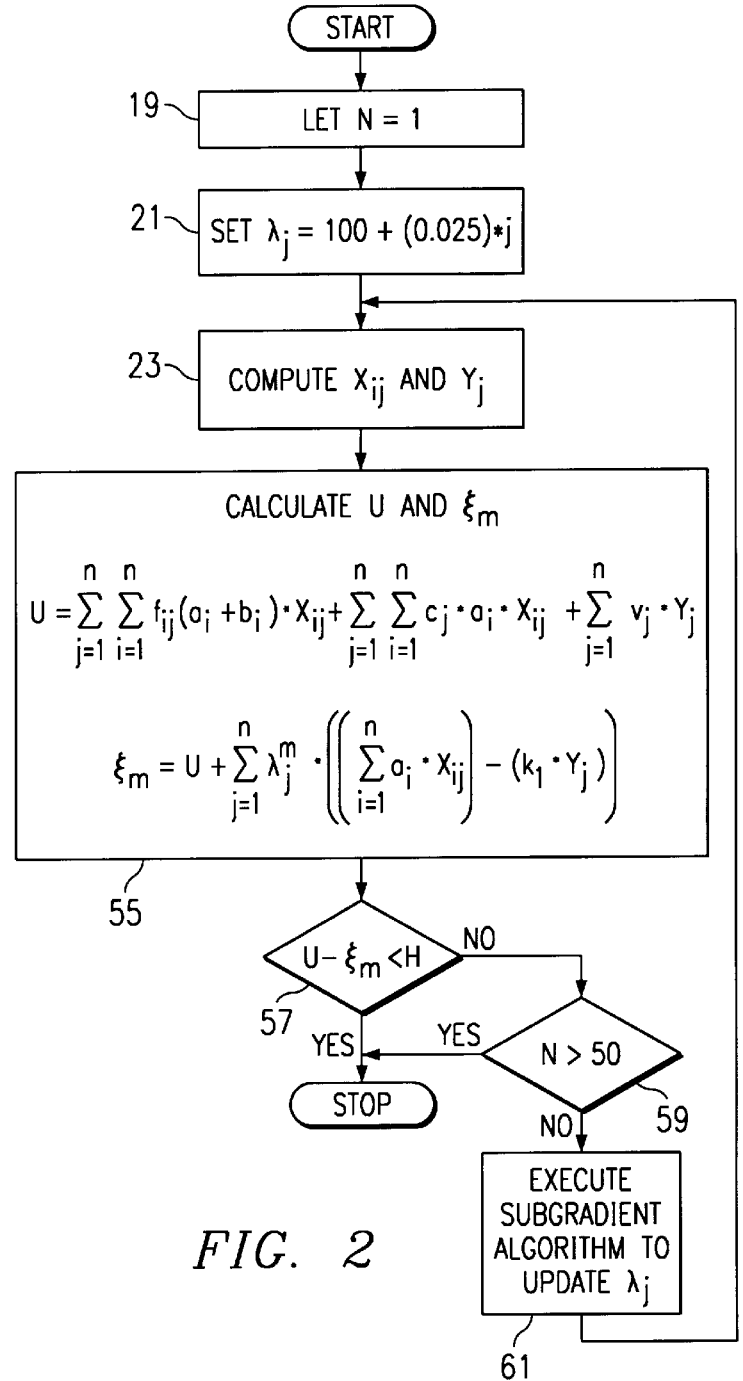
FIG. 2 is a flowchart of the node selection algorithm of the method of the present invention.

With the data in the four matrices, the method executes a node selection algorithm, indicated generally at block 17, and shown in detail in FIG. 2. Referring now to FIG. 2, the node selection algorithm is an iterative algorithm that is initialized by setting N equal to 1, at block 19. Then, the method sets an initial $\lambda_j^1$ for each node j, at block 21. In the preferred embodiment, $\lambda_j^1=100+0.025 \times j$. Thus, the initial $\lambda$ for node 1 is equal to 100.025. Similarly, the initial $\lambda$ for node 2 is 100.050. In a network with 200 nodes, the initial $\lambda$ for node 200 is 105.0.

Figure 4:
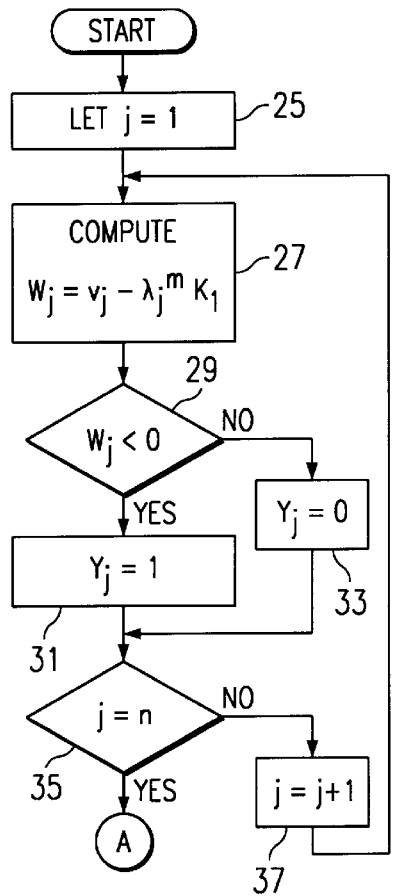
FIG. 4 is a flowchart of the core node selection subroutine of the method of the present invention.

After the method has set the initial $\lambda_j$, the system computes $X_{ij}$ and $Y_j$, as indicated generally at block 23. The subroutine for computing $Y_j$ is shown in FIG. 4. Referring to FIG. 4, the subroutine lets j=1 at block 25. Then, the method computes $W_j$, which is equal to $v_j - \lambda_j^m k_1$, at block 27. Accordingly, $W_j$ is the facility cost to install a core switch at node j minus $\lambda_j$ times the number of ports in a core node switch. The system tests, at decision block 29, whether $w_j$ is less than 0. If so, $Y_j$ equals 1, at block 31, which indicates that node j is selected as a core node. If not, $Y_j$ is equal to 0, at block 33, indicating that node j is not selected as a core node. Then, the method tests at decision block 35 whether j is equal to n, the number of nodes in the network. If not, the method sets j=j+1 at block 37 and tests the next node. The method continues to loop through the nodes until, at decision block 35, all nodes have been tested. At the end of the core node selection subroutine of FIG. 4, a set of core nodes j have been selected, thereby leaving a remaining set of source nodes i.

Figure 5:
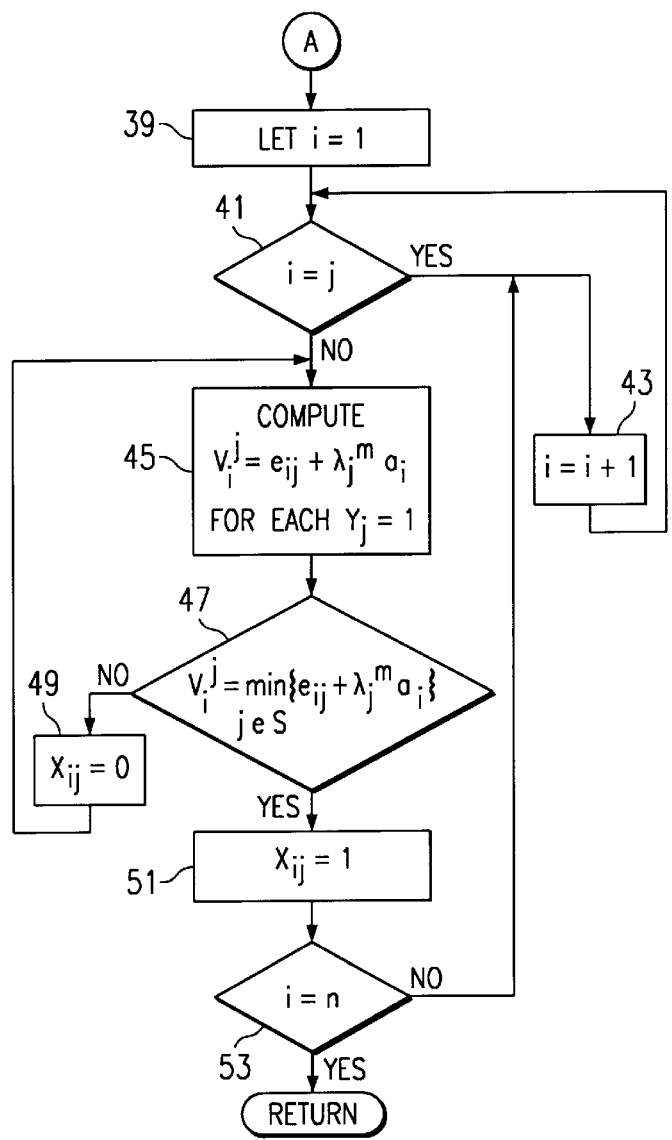
FIG. 5 is a flowchart of the homing subroutine of the method of the present invention.

Referring to FIG. 5, there is shown the logic of the homing subroutine of the present invention. First, at block 39, the method lets i=1. Then, at decision block 41, the method tests whether or not i has already been selected as a core node j. If so, the method lets i=i+1 at block 43 and returns to test the next node i. If at decision block 41, node i has not previously been selected as a core node, the method computes, at block 45, $V_i^j$ for each j for which $Y_j=1$. $V_i^j$ is $e_{ij}+\lambda_j^m \alpha_i$. It will be recalled that $e_{ij}=f_{ij}(\alpha_i+b_i)+c_j\alpha_i$. Then, the method tests, at decision block 47, whether or not $V_i^j$ is a minimum. If not, $X_{ij}=0$ at block 49. If $V_i^j$ is a minimum, then $X_{ij}=1$, at block 51, and the method tests, at decision block 53 whether or not i=n. If not, the method lets i=i+1 at block 43 and tests the next node i. Accordingly, the method loops through the subroutine of FIG. 5 until, at decision block 53, all nodes i have been tested. At the conclusion of the subroutine of FIG. 5, each source node i has been homed to a core node j that results in the lowest cost for the homing.

Referring again to FIG. 2, after the method has computed $X_{ij}$ and $Y_j$, then the method calculates, at block 55, an upper bound U for total network cost and a lower bound $\xi_m$. Then, the system tests at decision block 57 whether or not the difference between the upper bound and the lower bound is less than a preselected constant H, which in the preferred embodiment is equal to 0.001. If so, a near optimum solution has been found, and the method is finished. If not, the method tests at decision block 59 whether or not the number of iterations through the node selection algorithm is greater than 50. If so, then a near optimum solution has been reached. If not, the method executes the subgradient algorithm to update $\lambda_j$, indicated generally at block 61, and returns to block 23 to recompute $X_{ij}$ and $Y_j$.

Figure 3:
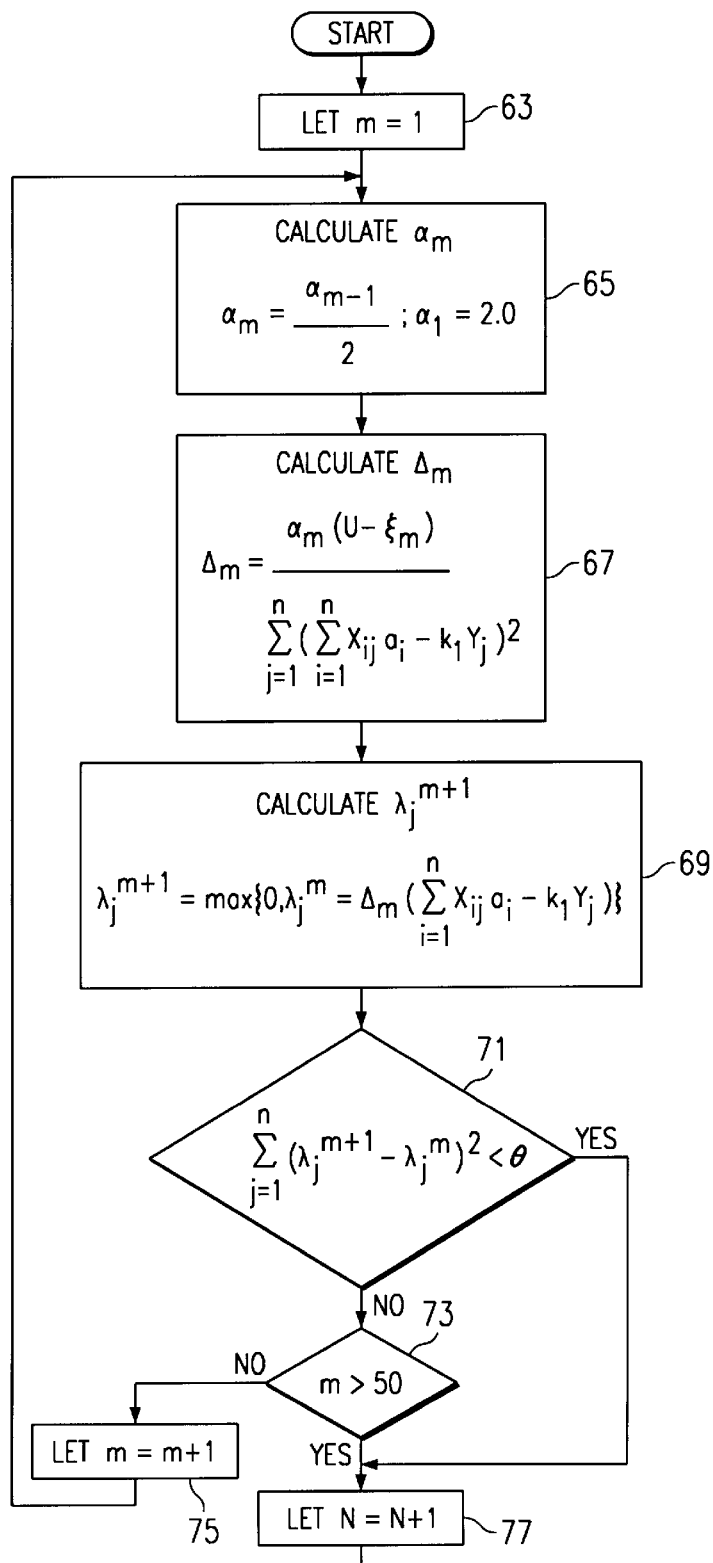
FIG. 3 is a flowchart of the subgradient algorithm of the method of the present invention.

Referring now to FIG. 3, the subgradient algorithm begins at block 63 by setting m=1. Then, at block 65, the system calculates $\alpha_m$ according to the following equation:

$$\alpha_n = \frac{\alpha_{n-1}}{2} \; ; \; \alpha_1 = 2.0.$$

Thus, $\alpha_1$=2.0, $\alpha_2$=1.0, $\alpha_3$=0.5, etc. Then, at block 67, the method calculates $\Delta_m$ as follows:

$$\Delta_m = \frac{\alpha_m(U - \xi_m)}{\sum_{j=1}^{n}\left(\sum_{i=1}^{n} X_{ij} \cdot a_i - k_1 Y_j\right)^2}.$$

Then, at block 69, the method calculates $\lambda_j^{m+1}$ as follows:

$$\lambda_j^{(m+1)} = \max\left\{0, \lambda_j^m + \Delta_m\left(\sum_{i=1}^{n} X_{ij} \cdot a_i - k_1 Y_j\right)\right\}.$$

Then, the method tests at decision block 71 whether or not the sum of the squares of the differences of $\lambda_j^{m+1} - \lambda_j^m$ is less than a preselected constant θ, which in the preferred embodiment is equal to 0.0001. If so, the method lets N=N+1 and returns to block 23 of FIG. 2 to recompute $X_{ij}$ and $Y_j$. If, at decision block 71, the sum of the squares of the differences is not less than θ, the method tests at decision block 73 whether or not m is greater than 50. If not, the method lets m=m+1, at block 75 and returns to block 65 for another iteration of the $\lambda_j^{m+1}$ calculation. If, at decision block 73, m is greater than 50, the method lets N=N+1 at block 77 and returns to block 23 of FIG. 2.

Thus, the method of the present invention adjusts the $\lambda_j$, reselects the core nodes j, and rehomes the source nodes i until an the iteration converge on a near optimum solution. The output of the method identifies the locations of the core nodes j and which source nodes i home to each core node j. With a moderately powerful reduced instruction set workstation, the method of the present invention converges on an optimum solution within a few minutes, rather than hours required by prior art methods.

What is claimed is:

1. A method of locating concentrator switches in an existing network including a plurality of sites interconnected by existing links so as to minimize total network cost in terms of transmission cost, equipment cost, and facility cost, said transmission cost including the cost of the links, said equipment cost including the cost per port of said concentrator switches, and said facility cost including the cost to install a concentrator switch at a location, said method comprising the computer implemented steps of:

(a) assigning to each site j an initial factor $\lambda_j$;
   (b) selecting from said sites a set of core nodes j such that the facility cost $v_j$ for each selected core node j is less than the factor $\lambda_j$ for the site multiplied by the number of ports $k_1$ in a concentrator switch, thereby forming a set of remaining source nodes i;
   (c) homing each one of the source nodes i to a single selected core node j such that the cost to connect a source node i to a selected core node j plus the factor $\lambda_j$ for the selected core node j multiplied by the traffic $a_i$ from said source node i is a minimum;
   (d) calculating an upper bound and a lower bound for the cost of the network configured according to steps (b) and (c);
   (e) adjusting the factor $\lambda_j$ for each site j and repeating steps (b) through (d) until the difference between the upper bound and the lower bound is less than a preselected amount.

2. The method as claimed in claim 1, including the step of repeating steps (b) through (d) until the sooner to occur of the difference between the upper bound and the lower bound being less than said preselected amount, and the number of repetitions of steps (b) through (d) equaling a preselected number.

3. The method as claimed in claim 1, wherein said core nodes j are selected such that $Y_j$=1, where $$Y_j = \begin{cases} 1 & \text{if } (v_j - \lambda_j \cdot k_1) < 0 \\ 0 & \text{else} \end{cases}.$$

4. The method as claimed in claim 3, wherein each source node i is homed to a selected core node j such that $X_{ij}$=1, where $$X_{ij} = \begin{cases} 1 & \text{if } j = \min_{j \in S} (e_{ij} + \lambda_j \cdot a_i), e_{ij} = f_{ij}(a_i + b_i) + c_j a_i, \\ 0 & \text{else} \end{cases}$$

$f_{ij}$ is the transmission cost from source i to node j, $a_i$ is the total traffic originated at node i, $b_i$ is the total traffic terminated at node i, and $c_j$ is the cost per port in a concentrator switch at a core node j.

5. The method as claimed in claim 4, wherein said initial factor $\lambda_j$ is selected such that $\lambda_j$=100+(0.025)*j.

6. The method as claimed in claim 5, wherein the upper bound U is defined such that $$U = \sum_{j=1}^{n}\sum_{i=1}^{n} f_{ij} \cdot X_{ij} + \sum_{j=1}^{n}\sum_{i=1}^{n} c_j \cdot a_j \cdot X_{ij} + \sum_{j=1}^{n} v_j \cdot Y_j$$

and the lower bound $\xi_m$ is defined such that $$\xi_m = U + \sum_{j=1}^{n} \lambda_j^m \cdot \left(\left(\sum_{i=1}^{n} a_i \cdot X_{ij}\right) - (k_1 \cdot Y_j)\right).$$

7. The method as claimed in claim 6, wherein $\lambda_j$ is adjusted such that $$\lambda_j^{(m+1)} = \max\left\{0, \lambda_j^m + \Delta_m\left(\sum_{i=1}^{n} X_{ij} \cdot a_i - k_1 Y_j\right)\right\}$$

where $$\Delta_m = \frac{\alpha_m(U - \xi_m)}{\sum_{j=1}^{n}\left(\sum_{i=1}^{n} X_{ij} \cdot a_i - k_1 Y_j\right)^2}$$

and $\alpha_m = \frac{\alpha_{m-1}}{2}$ ; $\alpha_1 = 2.0$.

8. The method as claimed in claim 7, wherein the step of adjusting $\lambda_j$ includes the steps of:

(i) letting m=m+1;

(ii) recomputing $\alpha_m$, $\Delta_m$, and $\lambda_j$; and, (iii) repeating steps (i) and (ii) until $$\sum_{j=1}^{n} (\lambda_j^{(m+1)} - \lambda_j^m)^2 < \theta,$$

where $\theta$ is a preselected constant.

9. The method as claimed in claim 8, wherein the step of adjusting $\lambda_j$ includes the steps of:

(iii) repeating steps (i) and (ii) until the sooner to occur of $$\sum_{j=1}^{n} (\lambda_j^{(m+1)} - \lambda_j^m)^2 < \theta,$$

and m being greater than a preselected value.

10. A method of locating concentrator switches having a number of ports $k_1$ in an existing network including a plurality of sites interconnected by existing links, so as to minimize total network cost in terms of transmission cost, equipment cost, and facility cost, said method comprising the computer implemented steps of:

(a) setting, for each site j, an initial $\lambda_j$=100+(0.025)*j;

(b) selecting from said sites a set of core nodes j such that $Y_j$=1, where $$Y_j = \begin{cases} 1 & \text{if } (v_j - \lambda_j \cdot k_1) < 0 \\ 0 & \text{else} \end{cases}$$

and $v_j$ is the facility cost of installing a concentrator switch at node j, thereby forming a set of remaining source nodes i;

(c) homing each source node i to a single selected core node j such that $X_{ij}$=1, where $$X_{ij} = \begin{cases} 1 & \text{if } j = \min_{j \, S} (e_{ij} + \lambda_j \cdot a_i), \\ 0 & \text{else} \end{cases}$$

$e_{ij}=f_{ij}(\alpha_i+b_i)+c_j\alpha_i$, $f_{ij}$ is the transmission cost from source i to node j, $a_i$ is the total traffic originated at node i, $b_i$ is the total traffic terminated at node i, and $c_j$ is the cost per port in a concentrator switch at a core node j;

(d) calculating an upper bound U such that $$U = \sum_{j=1}^{n} \sum_{i=1}^{n} f_{ij} \cdot X_{ij} + \sum_{j=1}^{n} \sum_{i=1}^{n} c_j \cdot a_i \cdot X_{ij} + \sum_{j=1}^{n} v_j \cdot Y_j$$

(e) calculating a lower bound $\xi_m$ such that $$\xi_m = U + \sum_{j=1}^{n} \lambda_j^m \cdot \left( \left( \sum_{i=1}^{n} a_i \cdot X_{ij} \right) - (k_1 \cdot Y_j) \right)$$

(f) whenever the difference between the upper bound and the lower bound is greater than a preselected amount, adjusting $\lambda_j$ such that $$\lambda_j^{(m+1)} = \max \left\{ 0, \lambda_j^m + \Delta_m \left( \sum_{i=1}^{n} X_{ij} \cdot a_i - k_1 Y_j \right) \right\}$$

where $$\Delta_m = \frac{\alpha_m(U - \xi_m)}{\sum_{j=1}^{n} \left( \sum_{i=1}^{n} X_{ij} \cdot a_i - k_1 Y_j \right)^2}$$

and $\alpha_m = \frac{\alpha_{m-1}}{2}$ ; $\alpha_1 = 2.0$ (g) repeating steps (b) through (f) until the difference between the upper bound and the lower bound is less than said preselected amount.

11. The method as claimed in claim 10, including the step of repeating steps (b) through (f) until the sooner to occur of the difference between the upper bound and the lower bound being less than said preselected amount, and the number of repetitions of steps (b) through (f) equaling a preselected number.

12. The method as claimed in claim 10, wherein the step of adjusting $\lambda_j$ includes the steps of:

(h) letting m=m+1;

(i) recomputing $\alpha_m$, $\Delta_m$, and $\lambda_j$; and, (j) repeating steps (h) and (i) until $$\sum_{j=1}^{n} (\lambda_j^{(m+1)} - \lambda_j^m)^2 < \theta,$$

where $\theta$ is a preselected constant.

13. The method as claimed in claim 12, wherein the step of adjusting $\lambda_j$ includes the steps of:

repeating steps (h) and (i) until the sooner to occur of $$\sum_{j=1}^{n} (\lambda_j^{(m+1)} - \lambda_j^m)^2 < \theta,$$

where $\theta$ is a preselected constant, and m is greater than a preselected value.

14. The method as claimed in claim 10, wherein said preselected amount of the difference between the upper bound and the lower bound is substantially equal to 0.001.

15. The method as claimed in claim 11, wherein the preselected number of repetitions of steps (b) through (f) is substantially equal to 100.

16. The method as claimed in claim 12, wherein $\theta$ is substantially equal to 0.0001.

17. The method as claimed in claim 13, wherein the preselected value that m is greater than about 50.

* * * * *